April 1, 1969  R. S. CAMPBELL  3,436,013
MULTI-BASE COUNTER MECHANISM
Filed Dec. 19, 1966  Sheet 1 of 4

INVENTOR
Richard S. Campbell
BY Wilkinson, Mawhinney & Theibault
ATTORNEYS

INVENTOR
Richard S. Campbell

April 1, 1969     R. S. CAMPBELL     3,436,013
MULTI-BASE COUNTER MECHANISM

Filed Dec. 19, 1966     Sheet 4 of 4

INVENTOR
Richard S. Campbell

BY Wilkinson, Mawhinney & Theibault
ATTORNEYS

United States Patent Office 3,436,013
Patented Apr. 1, 1969

3,436,013
MULTI-BASE COUNTER MECHANISM
Richard S. Campbell, 236 Holly Drive,
Spartanburg, S.C. 29301
Filed Dec. 19, 1966, Ser. No. 603,001
Int. Cl. G06c 27/00
U.S. Cl. 235—74                                8 Claims

ABSTRACT OF THE DISCLOSURE

The invention provides a movable table of numbers according to the new math by which numbers of one base system may be converted to corresponding numbers of another base system by use of numeral interrelated gear wheels having read input origin point in relation to a master number gear wheel and a read output locus in relation to other entrained number gear wheels for showing in the latter locus a corresponding number of another selected base than that of the base of the master number gear wheel. The invention also involves a simple mechanical arrangement readily operable in which change gear number wheels can be quickly interchanged to afford a variety of base number systems into which conversions may be made.

---

The present invention relates to a multi-base counter mechanism and has for an object to provide a mechanism by which numbers related to a specified base system can be rapidly and accurately converted to corresponding numbers related to a different base system.

Another object of the invention is to provide a mechanism by which "Modern Math" may be taught and simplified.

Throughout our country many parents, teachers, and students are plagued by the new concept called "Modern Math." Of the many obstacles a novice must overcome in search of a thorough understanding of this subject, the one most difficult to comprehend appears to be the ever-present variation of the arithmetic "Bases."

With the foregoing and other objects in view, the invention will be more fully described hereinafter, and will be more particularly pointed out in the claims appended hereto.

In the drawings, wherein like symbols refer to like or corresponding parts throughout the several views.

Figure 5:
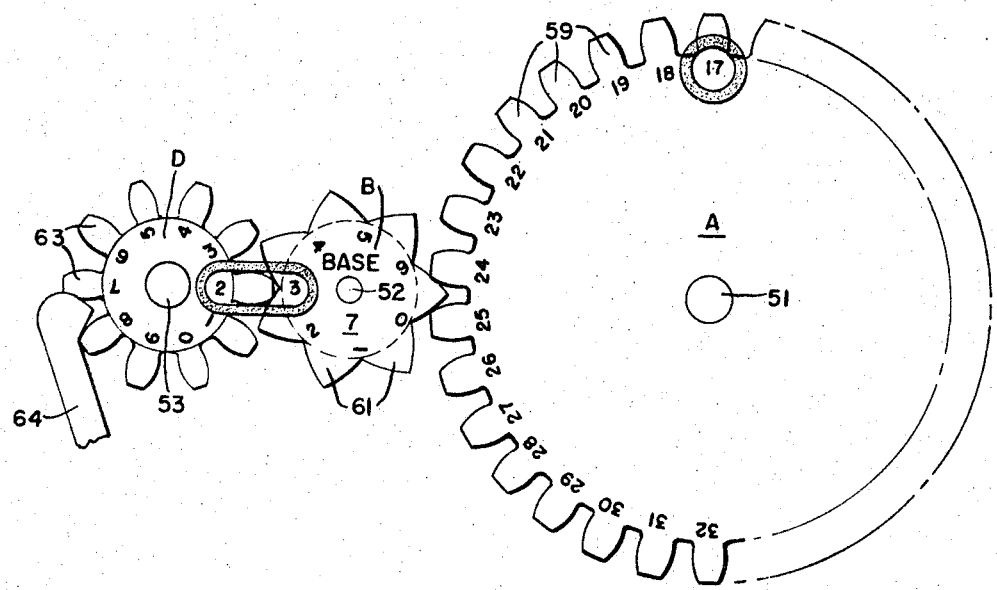
Figure 6:
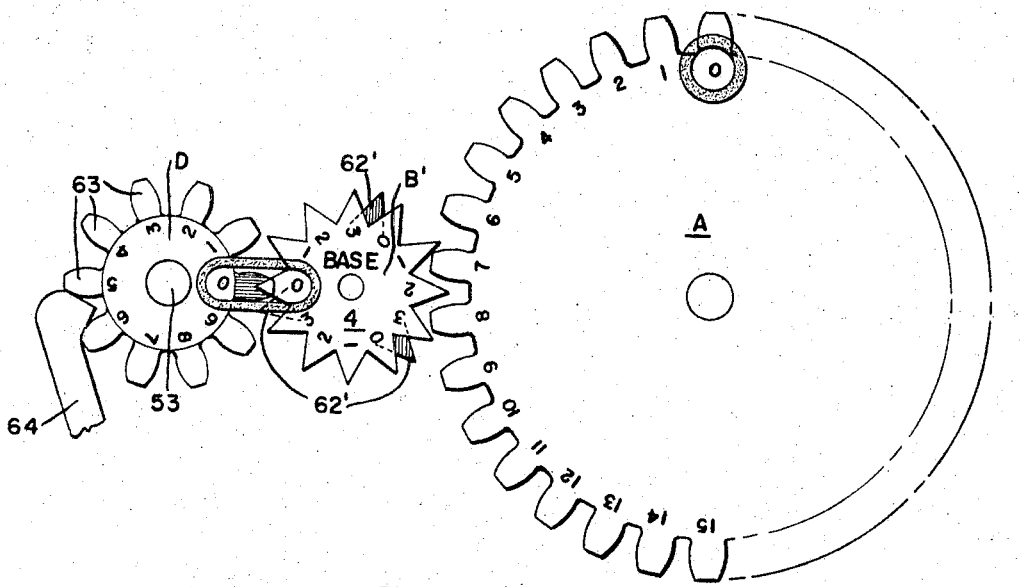
Figure 7:
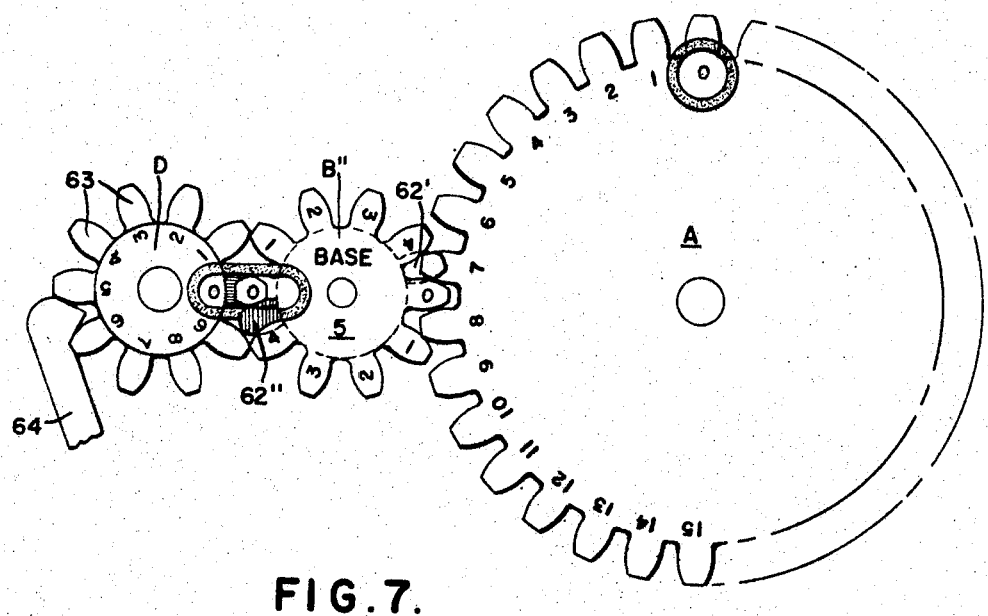
Figure 8:
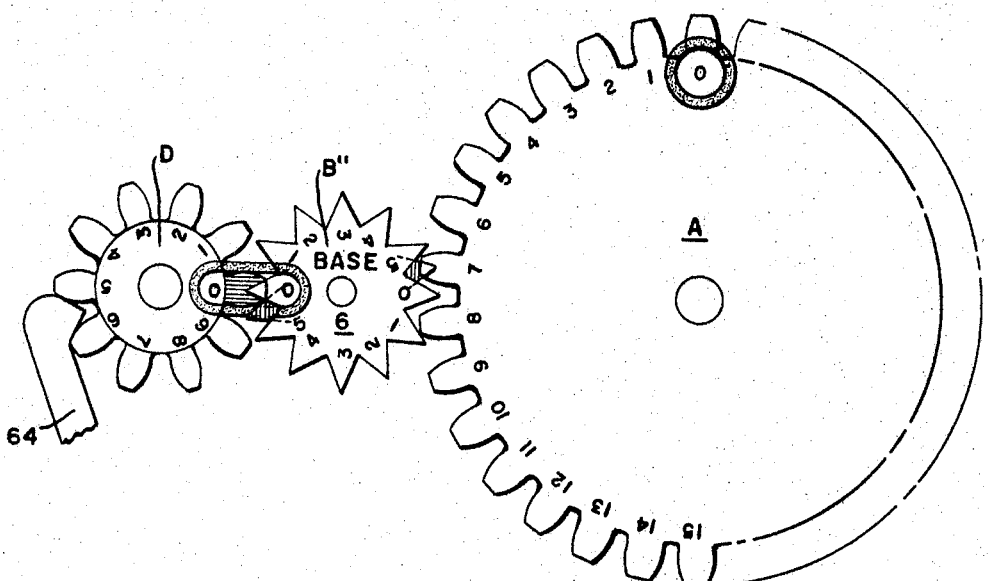
Figure 9:
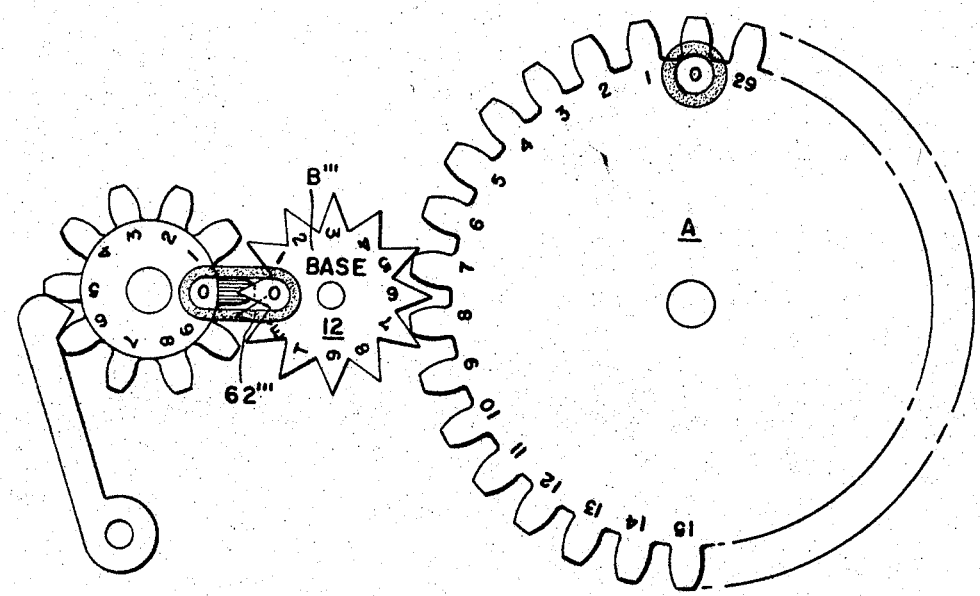
Figure 10:
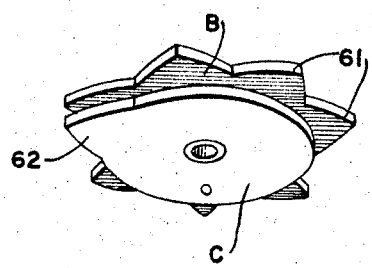
Figure 11:
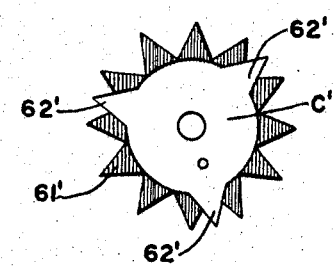

FIGURE 5 is a top plan view of the essential mechanism comprising three sets of gear wheels showing one solution in which the number 17 of the "Base-Ten" (10) on the master gear wheel produces the number 23, counterpart of the number 17 on the "Base-Seven" (7) system;

FIGURE 6 is a view similar to FIGURE 5 showing all number gear wheels in initial zero position but with the intermediate change gear wheel related to "Base-Four" (4);

FIGURE 7 is a view similar to FIGURE 5 showing that the intermediate change gear is related to the "Base-Five" (5);

FIGURE 8 is a view similar to FIGURE 5 showing the change gear related to "Base-Six" (6);

FIGURE 9 is a view similar to FIGURE 5 showing the intermediate change gear related to "Base-Twelve" (12);

FIGURE 10 is a bottom plan view of the intermediate change gear ("Base-Seven" (7) in this case) showing a single tooth on its bottom section;

FIGURE 11 is a bottom plan view of another form of intermediate change gear for "Base-Four" (4) requiring three teeth on its lower section.

Referring more particularly to the drawings and for the present to FIGURES 1 to 4 inclusive, A designates an input gear number wheel, B a base transmitter intermediate gear number wheel, C a carry gear wheel affixed to the underside of base transmitter wheel B, and D designates a carried gear number wheel.

All these wheels are mounted in any suitable manner to a foundation panel 50 which may have upstanding therefrom studs 51, 52 and 53 suitably spaced apart and preferably in alinement on which the various wheels are mounted to rotate about the respective studs as axes. The wheel A is mounted about the stud 51 upon a high step 54 as best seen in FIGURE 2.

The wheel B and its associated carry gear wheel C are together mounted to rotate about the stud 52, being supported upon a low intermediate step 55 of the panel.

The carried number wheel D is supported for rotation about the stud 53 on another low step 56 which enables this wheel D to occup a common plane with the carry gear wheel C so as to mesh therewith, which plane is offset downwardly from the plane of the input gear number wheel A and base transmitter intermediate gear number wheel B.

Figure 2:
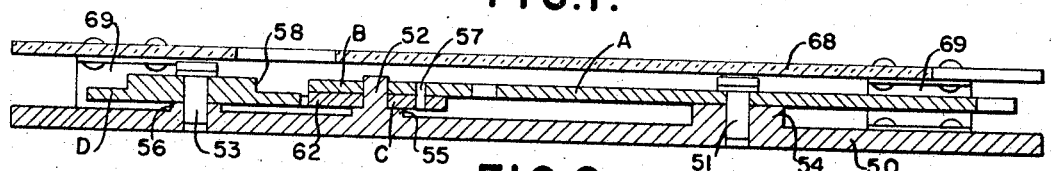
FIGURE 2 is a longitudinal sectional view taken on the line 2—2 of FIGURE 1.
Figure 3:
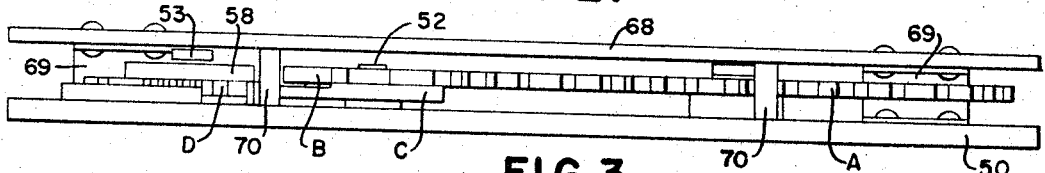
FIGURE 3 is a front edge view of the mechanism.

The wheels B and C may be connected in any suitable fashion, for instance, by a pin or screw connection 57 as shown in FIGURE 2, or may be integral. The wheel D has an integral or connected raised numeral disk 58 which may be in the plane of the wheel B for easier cooperative reading of the numbers therefrom.

The wheel A is provided with peripheral teeth 59 in any suitable number shaped as shown for ease in finger manipulation. The teeth 59 are numbered as an example from 0 to 29 in arithmetical progression counterclockwise of the gear wheel thus marking off thirty equal sequential segments.

A suitable indication, as by the arrow 60, indicates an origin point related to the number series on the wheel A. This arrow may be inscribed on the foundation panel or, where used, on a transparent cover panel. It indicates the point from which the number on wheel A is to be read. The wheel A may be rotated by hand to bring any number to this origin point, and as indicated by the legend in FIGURE 1, this number is the input number. The numbers appearing on wheel A are related to the "Base-Ten" (10).

Figure 1:
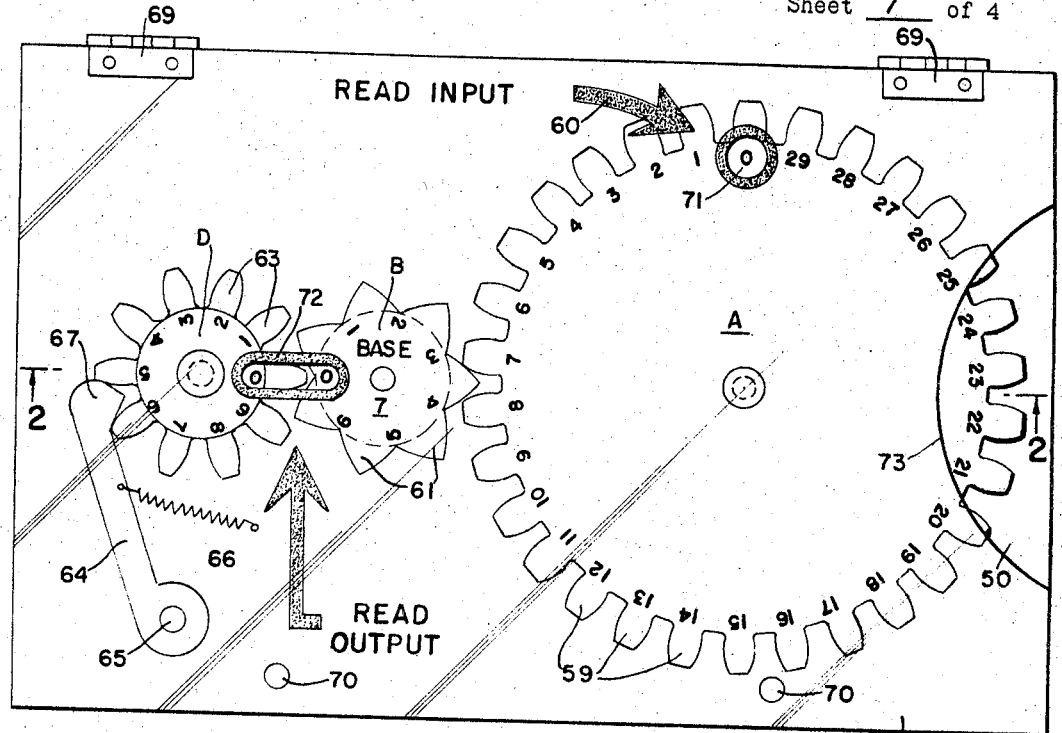
FIGURE 1 is a top plan view of one form of mechanism for accomplishing the purposes of the invention.
Figure 4:
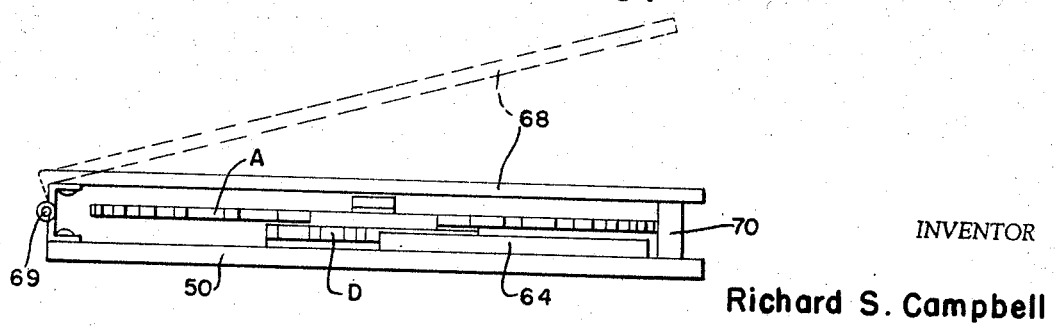
FIGURE 4 is a left end elevation showing in dotted lines a cover, where used, partially raised in dotted lines.

The change intermediate gear B has teeth 61, being seven in number as shown in FIGURE 1, which teeth intermesh with the teeth 59 of wheel A. The teeth 61 are shown as triangular to better cooperate with tapered outer portions of the teeth 59. The teeth 61 are seven in number corresponding to "Base-Seven" (7) to which this wheel B relates. Number wheel B bears at points intermediate adjacent teeth the number series 0, 1, 2, 3, 4, 5, 6. The carry gear C affixed beneath gear wheel B has only one tooth 62, which tooth 62 meshes with teeth 63 of the carried gear number wheel D so that for every revolution of wheels B and C the wheel D will be advanced the space of one tooth. The wheel D has an arithmetical series of numbers from 0 to 9 opposite the ten teeth 63 of the wheel D. The shape of the teeth 63 may simulate that of the teeth 59 of the wheel A so as the better to receive the V-shaped end of a pawl 64 pivoted at 65 on the foundation panel and yieldably biased by a spring 66 to a closed position with the teeth 63. However, the relative shapes of teeth 63 and the pawl tooth 67 is such that the wheel D may be freely rotated in either direction but the pawl will tend to prevent overrunning and will center the numbers on the wheel D with a READ OUTPUT area, so designated on the foundation panel and by a suitable window in case the cover panel is employed.

Where used, a cover panel 68, preferably of glass, plastic or other suitable material, is hinged as indicated at 69 in FIGURE 4 to the foundation panel 50 by high hinges which enable the cover panel when closed down upon the stop post 70 which upstands from the foundation panel a distance to arrest the downward movement of the cover 68 in a position at least slightly above the various wheels, studs and other moving parts of the mechanism.

Where this clear plastic or other transparent cover panel 68 is used, the arrow 60, the words READ INPUT and READ OUTPUT in combination with segregated windows 71 and 72 will be stacked off by colored or other tape, paint, or the like.

The transparent cover panel 68, where used, will have a cutout portion 73 (FIGURE 1) for exposing a segment of the teeth 59 of wheel A to the fingers of the operator for rotating this wheel in the one or the other direction to bring a selected number in registry with the window or READ INPUT area 71.

On rotating the wheel A the wheel B will be given an opposite motion rotation while the wheel D will be given the same motion as the wheel A. Consequently, the numeral system on wheels B and D will be in relatively reverse order. In other words, the series of numbers from 0 to 6 on the wheel B are in a clockwise order, while the series of numbers 0 to 9 on the wheel D progress in an inverse or counterclockwise order.

It will be seen from FIGURE 1 that the READ OUTPUT area embraces both wheels B and D, that is to an extent at least to permit the read out of aligning numerals B and D. As shown in FIGURE 1, the preferred form of the invention shows the axes 51, 52 and 53 in alinement so that the READ OUTPUT area will be diametric with respect to both B and D and will mark off for reading the result from most closely adjacent areas of the wheels B and D.

FIGURE 5 of the drawings shows the input gear number wheel A as having been rotated to show at the READ INPUT point the number 17 and at the READ OUTPUT point the number 23 from wheels D and B, which is the number corresponding to 17 "Base-Ten" in "Base-Seven."

FIGURE 6 shows the wheel A at origin zero while a substitute change gear B' is also in origin position as is wheel D showing at the READ OUTPUT 00.

In this FIGURE 6, the change gear B' shows on its face "Base-Four." In FIGURE 11, the associated carry gear wheel C' is shown as having three teeth 62' separated at angles of 120° apart so that a single revolution of gear wheel B' will operate to move the entrained carried gear wheel D through an angular distance of three teeth 63. This substitute wheel B' shows digits 0, 1, 2, 3, repeated three times about its periphery from which project twelve teeth. This relation of numerals and teeth are calculated to convert any number from input gear wheel A on the "Base-Ten" to the corresponding number on the "Base-Four."

FIGURE 7 shows a similar system related to "Base-Five" (5) as indicated on the change wheel B'' with the teeth numbered 0, 1, 2, 3, 4, 0, 1, 2, 3, 4, and with its carry gear wheel having two diametrically opposite teeth 62''.

This wheel B'' will therefore drive the carried wheel D an angular distance of two of its teeth 63 for every revolution of change wheel B''.

FIGURE 8 shows a further change wheel B''' having twelve teeth numbered in two repeated series 0, 1, 2, 3, 4, 5 ("Base-Six"(6)).

FIGURE 9 shows a further change base transmitter wheel B'''' related as inscribed thereon to "Base-Twelve" (12) and bearing the numeral designation 0, 1, 2, 3, 4, 5, 6, 7, 8, 9, T, E, showing twelve teeth and having a single tooth 62''''' on its corresponding carry gear wheel C. The number of teeth for the numeral system on this change gear B'''' and the single tooth 62''''' of its carry gear are all plotted and calculated to convert numbers from "Base-Ten" (10) wheel A to the corresponding number of "Base-Twelve" (12) which will be shown at the READ OUTPUT location.

For clarity in functional description, let it be understood that all numbers referred to without "Base" are actually to the "Base Ten."

(A)

(a) Rotate the input gear part A, to the number desired for conversion.

(b) On the base transmitter, part B, and output gear, part D, read the equivalent number to the Base-Seven.

EXAMPLE I (1) Turn input, part A, to number seventeen (17).
(2) Read on output gear, part D, the number two (2).
(3) Read on base transmitter, part B, the number 3.
(4) The total answer is 23 to the "Base Seven."

(B)

To add a number to a number to the "Base Seven."

(a) Rotate the input gear, part A, clockwise until the given number to the "Base Seven" appears on parts B and D.

(b) Then continue rotating clockwise the input gear, part A, to absorb the number to be summed.

(c) Read answer to the "Base Seven" on parts B and D.

EXAMPLE II

Add the number nine (9) to the number twenty-six (26) to the "Base Seven."

Solution (a) Turn input, part A, clockwise until the number twenty-six (26) appears on parts B and D. Incidentally part A will read twenty (20).

(b) Rotate input, part A, clockwise nine additional units and it will read twenty-nine (29).

(c) Read answer on parts B and D. Forty-one (41) to the "Base Seven."

(C)

To subtract a number from a number to the "Base Seven."

(a) Rotate the input, part A, clockwise until the given number to the "Base Seven" appears on parts B and D.

(b) Rotate the input, part A, in the opposite direction (counter clockwise) to absorb the number to be subtracted.

(c) Read answer to the "Base Seven" on parts B and D.

EXAMPLE III

Subtract eleven (11) from the number thirty-five (35) to the "Base Seven."

(a) Rotate the input, part A, clockwise until the number thirty-five (35) appears on parts B and D. On the input, part A, we will read twenty-six (26).

(b) Rotate the input, part A, counter clockwise eleven (11) units to fifteen (15).

(c) Read answer on B and D the number (21) to the "Base Seven."

The present carried gear (D) was selected to show the limitations and capacity of a two digit number. To increase the readout to (N+1) orders then we would need (N) number of base transmitters B and parts C. In fact, to convert a number in the binary system requiring 10 orders then 10 base transmitters B and 9 carry gears C are required. The present carried gear in addition to the aforementioned statement also was selected for versatility.

To illustrate the capacity of a two digit number:

Assume "Base-Five" (5) transmitter is in place.
Rotates wheel A to the number 25 ("Base-Ten" (10)).
Read on D and B number 50 ("Base-Five" (5)).
The symbol (5) does not exist in the "Base-Five" system.
The number 25 ("Base-Ten" (10)) converted to "Base-Five" is 100 which requires three digits.

By getting two orders understood, then all other orders are repetitive and the mechanism is simplified.

Expansion simply requires adding base transmitters and associated carry gears.

While reference herein made to the use of this device as an educational aid, the same may also find application throughout the computer and manipulation fields.

What is claimed is:

1. A multi-base counter mechanism comprising
  (a) a foundation panel,
  (b) an input gear number wheel rotatably mounted on the panel,
  (c) a base transmitter intermediate change gear number wheel detachably and also rotatably mounted to the panel in mesh with the input gear wheel,
  (d) a carry gear wheel affixed to the base transmitter gear wheel in a plane offset from that of the intermeshing input and base transmitter gear wheels,
  (e) a carried gear number wheel rotatably mounted to the panel in mesh with the carry gear wheel,
  (f) a read input designated area on the panel to which a selected number on the input gear wheel may be turned for conversion to a selected different base, and
  (g) a read output on the panel embracing adjacent areas of the base transmitter gear wheel and carried gear wheel at which the conversion number appears on the selected different base.

2. A multi-base counter mechanism as claimed in claim 1 further comprising
  (h) peripheral teeth on the input gear wheel defining successive segmental areas numbered in an arithmetical series adapted to be selectively brought to the read input point by rotation of the input gear wheel for incidentally rotating at least the base transmitter gear wheel for showing at the read output area the corresponding number to the other base for which the change transmitter gear wheel has been selected.

3. A multi-base counter mechanism as claimed in claim 2 further comprising
  (h) peripheral teeth on the base transmitter change gear wheel meshing with the teeth of the input gear wheel for rotation of the change gear wheel in step with but oppositely to the rotation of the input gear wheel,
  (i) said base transmitter change gear wheel having successive segmented areas defined by the teeth thereof numbered in at least one digital series but reversely relatively to the numbered series of the input gear wheel to compensate for reversal of rotation of the change gear wheel relatively to the input gear wheel and whereby the digits of the base transmitter change gear will be brought successively to the read output area.

4. A multi-base counter mechanism as claimed in claim 3 further comprising
  (j) at least one tooth on the carry gear wheel for each numbered digital series on the base transmitter change gear for controlling the angular degrees of rotation imparted to the carried gear wheel.

5. A multi-base counter mechanism as claimed in claim 4 in which
  (k) each tooth on the carry gear wheel is fixedly located at substantially the end of each digital series.

6. A multi-base counter mechanism as claimed in claim 1 further comprising
  (h) a stud upstanding from the panel,
  (i) said base transmitter change gear wheel having a central bearing opening freely slidable over the stud to permit removal and substitutions of other base transmitter change gear wheels related to different arithmetical bases.

7. A multi-base counter mechanism as claimed in claim 1 further comprising
  (h) studs mounted to the panel in spaced relation,
  (i) a relatively high step associated with one stud for rotatably supporting the input gear wheel spaced above the panel,
  (j) a relatively low step associated with a second stud for receiving the carry gear wheel for supporting the base transmitter gear wheel at the elevation of and in mesh with the input gear wheel,
  (k) a second low stud for receiving and supporting the carried gear wheel at the elevation of and in mesh with the carry gear wheel, and
  (l) a number bearing member upstanding from and affixed to rotate with the carried gear wheel at substantially the elevation of the base transmitter gear wheel.

8. A multi-base counter mechanism as claimed in claim 1 further comprising
  (h) a transparent cover member adapted to removably overlie the panel and mechanism thereon on which are delineated the read input and read output areas.

References Cited
UNITED STATES PATENTS 2,797,047  6/1957  Lehre _____ 235—74
3,212,200  10/1965  Lundberg _____ 35—13

STEPHEN J. TOMSKY, *Primary Examiner.*

U.S. Cl. X.R.

35—30